US011222015B2

(12) United States Patent
Baggett et al.

(10) Patent No.: US 11,222,015 B2
(45) Date of Patent: *Jan. 11, 2022

(54) HELPER SCAN IN A DATABASE MANAGEMENT SYSTEM (71) Applicant: International Business Machines Corporation, Armonk, NY (US)

(72) Inventors: Brian L. Baggett, Renton, WA (US); Thomas A. Beavin, Milpitas, CA (US); Oliver Draese, Los Gatos, CA (US); Shuanglin Guo, Cupertino, CA (US); Andrei F. Lurie, San Jose, CA (US); Terence P. Purcell, Springfield, IL (US); Shengxi Suo, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 317 days.

This patent is subject to a terminal disclaimer.

(21) Appl. No.: 16/403,952

(22) Filed: May 6, 2019

(65) Prior Publication Data

US 2019/0258633 A1 Aug. 22, 2019

Related U.S. Application Data (63) Continuation of application No. 15/798,656, filed on Oct. 31, 2017, now Pat. No. 10,691,690.

(51) Int. Cl.
*G06F 16/24* (2019.01)
*G06F 16/2453* (2019.01)
(Continued)

(52) U.S. Cl.
CPC .... *G06F 16/24542* (2019.01); *G06F 16/2255* (2019.01); *G06F 16/24554* (2019.01)

(58) Field of Classification Search
CPC .......... G06F 16/24542; G06F 16/2282; G06F 16/2455; G06F 16/2255; G06F 16/2453;
(Continued)

(56) References Cited

U.S. PATENT DOCUMENTS 6,353,821 B1   3/2002   Gray
8,745,033 B2   6/2014   Day et al.
(Continued)

OTHER PUBLICATIONS

Chavez, Edgar, et al., "CDA: Succinct Spaghetti," International Conference on Similarity Search and Applications, Springer International Publishing, 2015, 12 pages.
(Continued)

*Primary Examiner* — Apu M Mofiz
*Assistant Examiner* — Cindy Nguyen
(74) *Attorney, Agent, or Firm* — SVL IPLaw; Steven Bouknight (57) ABSTRACT A method, system and computer program product are provided. A first index scan of records of a database table is performed. A first index used by the first index scan is specified in a DBMS query statement as being ordered by one or more field values of one or more fields of the first index. A second scan of the database table is performed to determine whether each respective record of the second scan is qualified based on one or more fields of the each respective record of the second scan and a predicate. A lookup data structure is built indicating whether each of the respective records of the second scan is qualified. The lookup data structure is used to determine whether a record of the first index scan is qualified when the lookup data structure becomes available.

6 Claims, 5 Drawing Sheets (51) Int. Cl.
*G06F 16/22* (2019.01)
*G06F 16/2455* (2019.01)

(58) Field of Classification Search
CPC ... G06F 16/278; G06F 16/24549; G06F 16/22
See application file for complete search history.

(56) References Cited

U.S. PATENT DOCUMENTS

| | | |
|---|---|---|
| 9,652,497 B2 | 5/2017 | Beavin et al. |
| 2007/0179858 A1 | 8/2007 | Jennings |
| 2014/0172823 A1* | 6/2014 | Kaminsky ............ G06F 16/2453 707/718 |
| 2015/0261820 A1* | 9/2015 | Cheng ................ G06F 16/24544 707/718 |
| 2017/0116275 A1 | 4/2017 | Baggett et al. |
| 2018/0336246 A1* | 11/2018 | Dasam ................ G06F 16/2453 |

OTHER PUBLICATIONS

List of IBM Patents or Patent Applications Treated as Related, filed May 6, 2019.

* cited by examiner

HELPER SCAN IN A DATABASE MANAGEMENT SYSTEM

BACKGROUND

Present invention embodiments relate to systems, methods and computer program products for supplementing a traditional index access plan in a database management system with a secondary, or helper, scan or scans. In particular, the present invention embodiments relate to systems, methods and computer program products for sharing information from one or more helper scans with a main index access method in order to improve filtering for the main index.

SQL performance of OnLine Transaction Processing (OLTP) queries in a traditional row store database is significantly influenced by coded WHERE clause predicates and available indexing. When an index that supports filtering on all available predicates is missing and/or multiple index choices exist, a single sub-optimal index may be chosen to support a required order for querying, or multiple index access may be chosen in which an intersection of filtering from each index may produce a result. With multiple index access, each index may provide an individual Record Identifier (RID) list and an intersection of the RID lists reduces a total number of entries. However, index key order is not preserved when RID lists are intersected using sorting or a hash intersection of the RID lists and any required order for a query must be sorted. Typically, multiple index access is advantageous only when available indexes provide matching index access such that each index access qualifies a subset of rows. Matching index access refers to an ability to use available WHERE clause predicates to limit a search range. Indexed predicates that are non-matching are applied for index screening. In other words, non-matching indexed predicates limit qualified index rows, but do not limit the number of index keys processed.

Sub-optimal index choices are demonstrated in the following SQL example, in which no index exists that can support both matching index access and sort avoidance to support an ORDER BY clause. In this example, no suitable indexes exist for a matching multi-index access.

Example 1

```
INDEX1 (LASTNAME, FIRSTNAME)
INDEX2 (CITY, STREET)
SELECT *
FROM PHONE_BOOK
WHERE STREET IN (?, ?)
ORDER BY LASTNAME, FIRSTNAME
FETCH FIRST 10 ROWS ONLY;
```

In the above example, INDEX1 provides order to support the ORDER BY clause, but does not provide filtering. INDEX2 provides non-matching filtering, but does not support order.

In a traditional row store database management system, available choices may be 1) a table space scan in which all rows are read and sorted for order, 2) a non-matching index scan of INDEX2 in which filtering is applied and qualified data rows are retrieved and sorted for order, or 3) a non-matching index scan of INDEX1 in which data row access is required to apply filtering, but sorting can be avoided. Choices 1 and 2 have consistent performance, although neither choice is optimal. Choice 3 can have varying performance depending on how early rows are found in the index scan that qualify against the predicates. In a worst-case scenario of choice 3, every index entry and every data row is read. This would be worse than either choices 1 or 2.

In the example above, multiple index access is not a viable option because INDEX1 qualifies all rows in the table, and thus, there would be no value to building a RID list of all RIDs to intersect with another index.

SUMMARY

In a first aspect of embodiments of the invention, a machine-implemented method is provided for using a secondary scan to optimize a database query. At least one computing device performs a first index scan of records of a database table. A first index used by the first index scan is specified in a database management system query statement as being ordered by one or more field values of one or more fields of the first index. A second scan of the database table is performed by the at least one computing device to determine whether each respective record of the second scan of the database table is qualified based on the one or more fields of the each respective record of the second scan and a predicate. A lookup data structure is built indicating whether each of the respective records of the second scan is qualified. The at least one computing device uses the lookup data structure to determine whether a record of the first scan is qualified when the lookup data structure becomes available.

In a second aspect of the embodiments, a system that uses a second scan to optimize a database query is provided. The system includes at least one processor and at least one memory connected with the at least one processor. The at least one processor is configured to perform a first index scan of records of a database table. A first index used by the first index scan is specified in a database management system query statement as being ordered by one or more field values of one or more fields of the first index. The second scan of the database table is performed to determine whether each respective record of the second scan of the database table is qualified based on one or more fields of the each respective record of the second scan and a predicate. A lookup data structure is built indicating whether each of the respective records of the second scan is qualified. The lookup data structure is used to determine whether a record of the first index scan is qualified when the lookup data structure becomes available.

In a third aspect of the embodiments, a computer program product is provided. A computer readable storage medium includes computer readable program code, embodied therewith, for execution on a processing system. The processing system performs a first index scan of records of a database table. A first index used by the first index scan is specified in a database management system query statement as being ordered by one or more field values of one or more fields of the first index. A second scan of the database table is performed to determine whether each respective record of the second scan of the database table is qualified based on one or more fields of the each respective record of the second scan and a predicate. A lookup data structure is built indicating whether each of the respective records of the second scan is qualified. The lookup data structure is used to determine whether a record of the first scan is qualified when the lookup data structure becomes available.

BRIEF DESCRIPTION OF THE DRAWINGS

Generally, like reference numerals in the various figures are utilized to designate like components.

DETAILED DESCRIPTION

Present invention embodiments include methods, systems and computer program products for supplementing a traditional index access plan step with one or more helper scans with filtering choices that complement a main index access method. Information from one or more helper scans can be shared with a main index access method in order to improve filtering. The main index access method does not depend on the helper scan and is capable of completing processing with or without filtering assistance. Further, various embodiments are capable of supporting order preservation, or sort avoidance, from the main index access method.

If a helper scan provides better filtering than a main index access method, then an access plan may be converted to use a helper scan result to drive data access and/or return a result to a next plan step.

Various embodiments may also apply to non-matching index scans, as well as other types of scans such as, for example, a table space scan, a scan of column-oriented data stores, and a scan via a separate accelerator. Filtering options from partitioning or clustering ranges may also be incorporated into any plan step.

Figure 1:
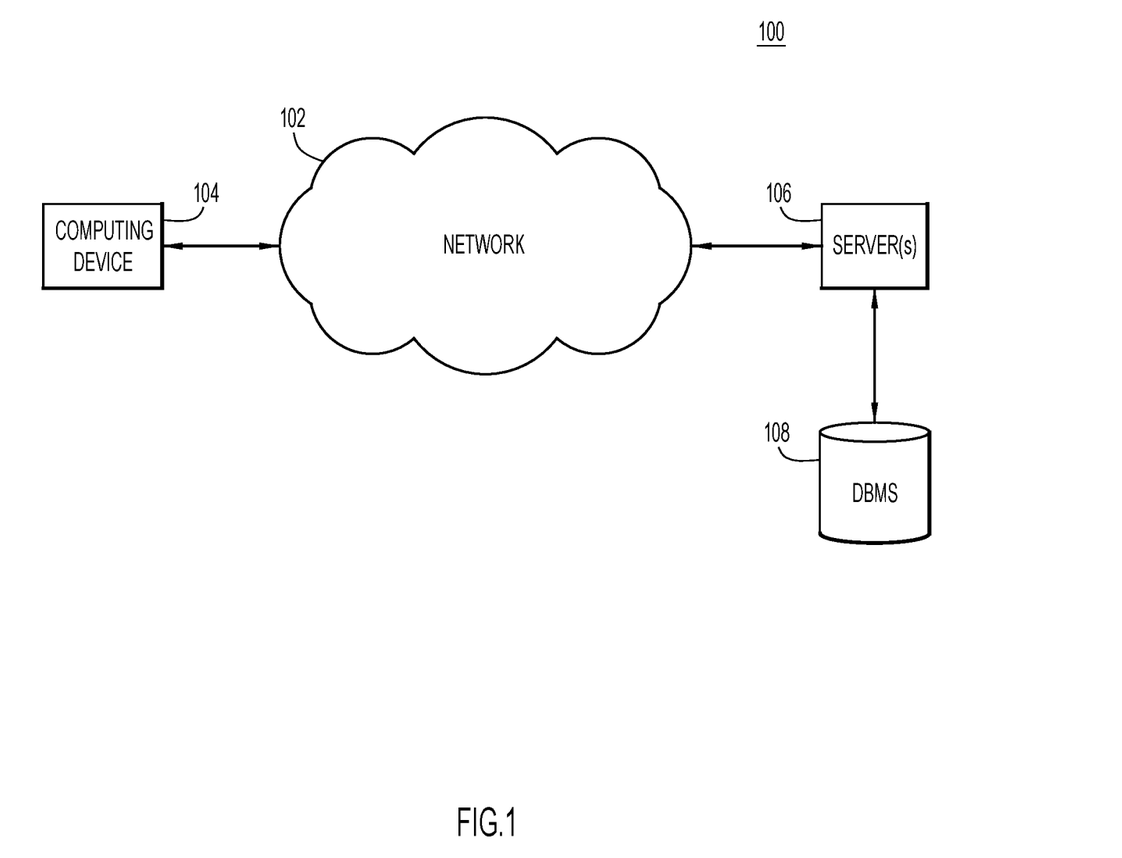
FIG. 1 illustrates an example environment in which various embodiments may operate.

FIG. 1 illustrates an example environment 100 in which embodiments may operate. Environment 100 may include one or more computing devices 104 having a wired or wireless connection to a network 102, and a server 106, or multiple servers configured as a server farm, having a wired or wireless connection to network 102. Server(s) 106 may have access to a DataBase Management System (DBMS) 108. Network 102 may include one or more networks such as a local area network (LAN), a general wide area network (WAN), a public network (e.g., the Internet) or any combination thereof.

In another example environment, DBMS 108 may be connected to a file server (not shown), separate from server(s) 106 and with a wired or wireless connection to network 102. Further, in a standalone environment, computing device 104 may include DBMS 108 and may or may not be connected to network 102.

Figure 2:
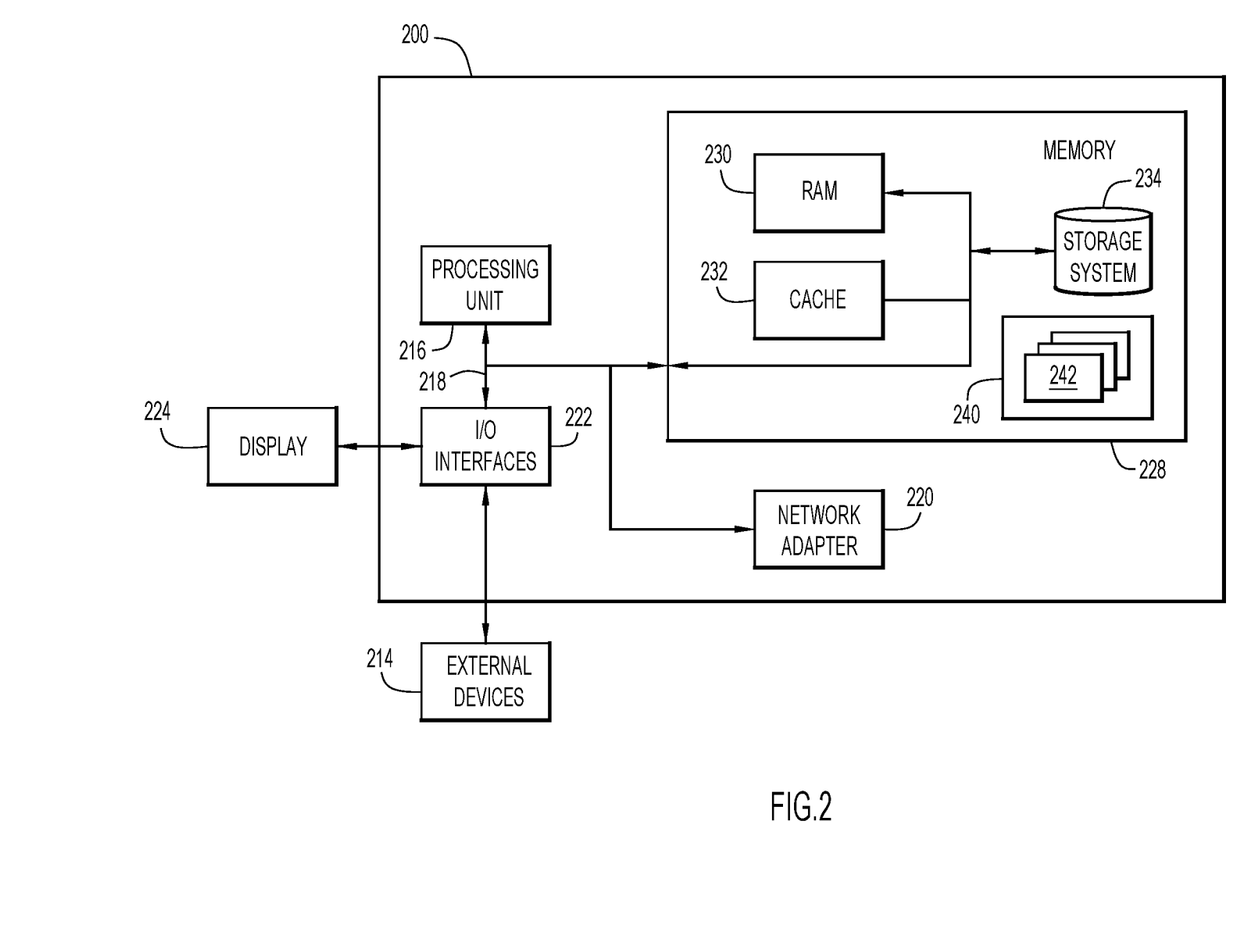
FIG. 2 is a functional block diagram of a computing system that may implement a computer system and a server, or servers in a server farm, in various embodiments.

FIG. 2 is a functional block diagram of a computing system 200 that may implement computing device 104 and/or server 106 in various embodiments of the invention. Computing system 200 is shown in a form of a general-purpose computing device. Components of computing system 200 may include, but are not limited to, one or more processors or processing units 216, a system memory 228, one or more Input/Output (I/O) interfaces 222, a network adapter 220 and a bus 218 that couples various system components including system memory 228, one or more I/O interfaces 222, and network adapter 220 to one or more processing units 216.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computing system 200 typically includes a variety of computer system readable media. Such media may be any available media that is accessible by computing system 200, and may include both volatile and non-volatile media, removable and non-removable media.

System memory 228 can include computer system readable media in the form of volatile memory, such as random access memory (RAM) 230 and/or cache memory 232. Computing system 200 may further include other removable/non-removable, volatile/non-volatile computer system storage media. By way of example only, storage system 234 can be provided for reading from and writing to a non-removable, non-volatile magnetic media (not shown, which may include a "hard drive" or a Secure Digital (SD) card). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 228 may include at least one program product having a set (e.g., at least one) of program modules that are configured to carry out the functions of embodiments of the invention.

Program/utility 240, having a set (at least one) of program modules 242, may be stored in memory 228 by way of example, and not limitation, as well as an operating system, one or more application programs, other program modules, and program data. Each of the operating system, the one or more application programs, the other program modules, and the program data or some combination thereof, may include an implementation of a networking environment. Program modules 242 generally carry out the functions and/or methodologies of embodiments of the invention as described herein.

Computing system 200 may also communicate with one or more external devices 214 such as a keyboard, a pointing device, one or more displays 224, one or more devices that enable a user to interact with computing system 200, and/or any devices (e.g., network card, modem, etc.) that enable computing system 200 to communicate with one or more other computing devices. Such communication can occur via Input/Output (I/O) interfaces 222. Still yet, computing system 200 may communicate with one or more networks such as a local area network (LAN), a general wide area network (WAN), and/or a public network (e.g., the Internet) via network adapter 220. As depicted, network adapter 220 communicates with the other components of computing system 200 via bus 218. It should be understood that, although not shown, other hardware and/or software components could be used in conjunction with computing system 200. Examples, include, but are not limited to: microcode, device drivers, redundant processing units, external disk drive arrays, RAID systems, tape drives, and data archival storage systems, etc.

Embodiments of the invention are demonstrated by referring to Example 1 above. INDEX1 provides sort avoidance for the ORDER BY clause, but does not provide any filtering. INDEX2 does not provide matching filtering, but does provide non-matched filtering of the predicate in the SQL statement. Further, INDEX2 requires a sort.

Given that no other optimal index exists, embodiments ensure that a query optimizer prefers a sort avoidance index, INDEX1, as a main, or driving, index. In a traditional single index plan, query processing would fetch a first row based on a RID from an entry of INDEX1 and would access the row to either qualify or disqualify the row. This would be repeated for each subsequent row until a first 10 qualified rows are returned (based upon FETCH FIRST 10 ROWS ONLY in the SQL statement) or an application stops fetching.

In this example, INDEX2 (i.e., a helper scan index) provides non-matching filtering. INDEX2 would be accessed by a separate task either sequentially or using parallelism for the separate task.

The helper index scan produces a RID list, wherein each of the RIDs of the RID list corresponds to a respective qualifying record. A lookup data structure may be built during the helper scan while INDEX1 is used for standard processing, in which each row is accessed and read to determine whether the row is qualified based on the predicate in the SQL statement. The lookup data structure may include, but not be limited to, a RID list, a hash table, a bit string, a bloom filter, or a page-based bitmap. Bloom filters are known to produce false positives. However, this is acceptable if predicate reapplication is performed to ensure that a row is still qualified.

Once the lookup data structure is available for use by the main index task, this task may use the lookup data structure to determine whether a record is qualified while maintaining an order of a main index, INDEX1. Thus, sorting can be avoided. In the above example, the lookup data structure is not available to the main index task until the helper scan task is completed.

Figure 3:
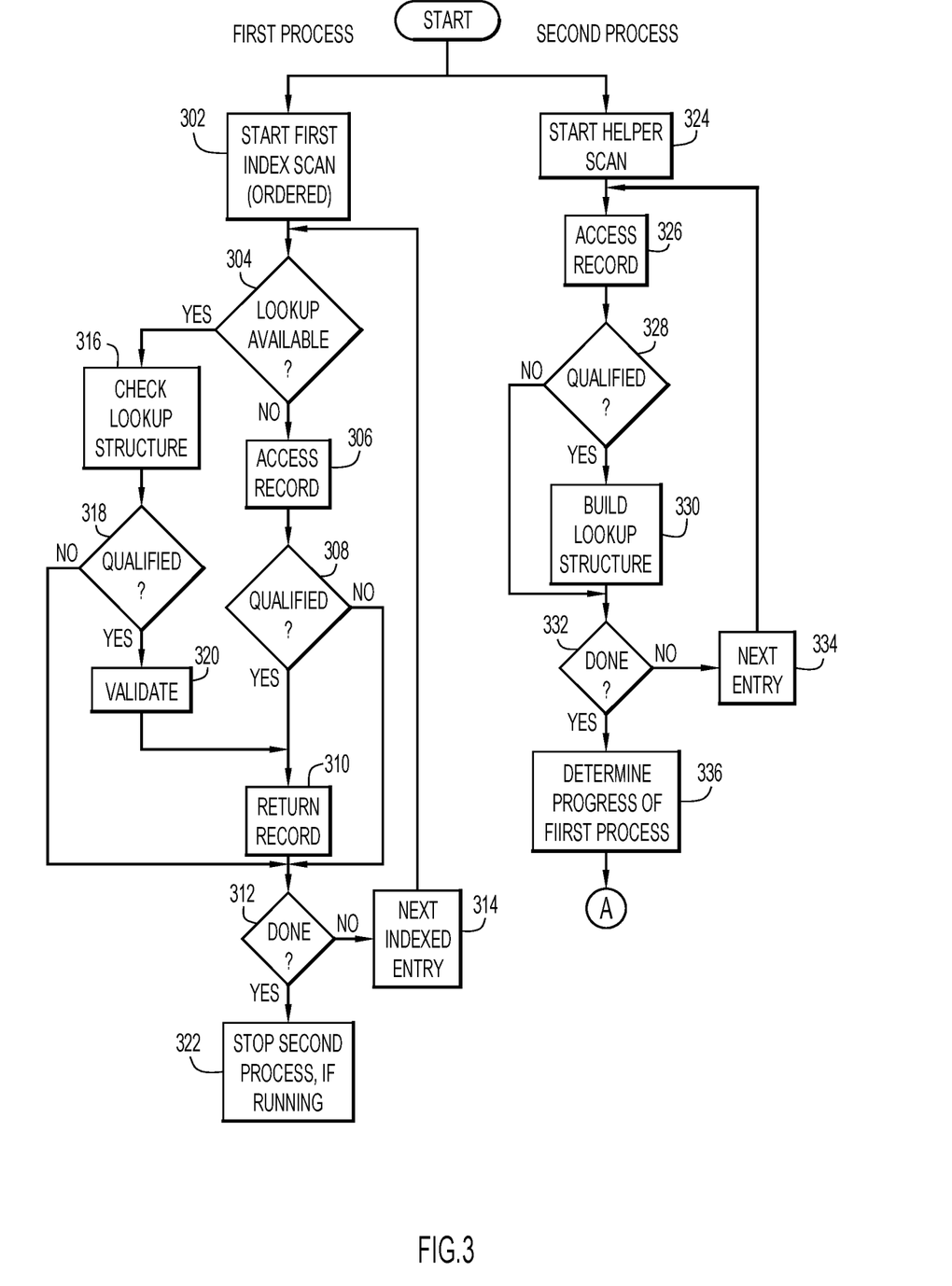
FIGS. 3 and 4 are flowcharts that explain example processing that may be performed by a computer system when performing a main index scan and a helper scan according to an embodiment of the present invention.

FIG. 3 is a flowchart that illustrates example processing that may be performed in various embodiments. The process may begin by starting a first process (act 302) and a second process (act 324). The processes may be started in parallel.

In the first process, after starting a first scan, or main index scan (act 302) of an ordered index, the first process may determine whether a lookup data structure built by the second process is available for use (act 304). The lookup data structure may include, but not be limited to, a RID list, a hash table, a bit string, a bloom filter or a page-based bitmap.

If the lookup data structure is not available, then, using the main index, a record of a database table, corresponding to a current RID entry of the main index, may be accessed (act 306) and one or more data fields of the record may be compared to a predicate in a SQL statement to determine whether the record is a qualifying record (act 308). The record is considered to be qualified when the one or more data fields satisfy the predicate in the SQL statement. If the record is determined to be qualified, then the record may be returned to an originator of the query (act 310).

If, during act 308, the record is determined not to be qualified, or after performing act 310 to return the qualified record, then a determination may be made regarding whether a last entry in the main index has been processed (act 312). If the last entry in the main index has not yet been processed, then a next RID entry of the main index may be accessed and acts 304-314 may be repeated.

If, during act 304, the lookup data structure is determined to be available, then the lookup data structure is checked (act 316) and, based on the lookup data structure, a determination is made regarding whether the record of the data base table, corresponding to the RID entry of the main index, is qualified (act 318). If the record is determined not to be qualified, then act 312 may be performed to determine whether a last entry of the main index has been processed.

If, during act 318, the corresponding record is determined to be qualified according to the lookup data structure, then the corresponding record may be accessed in order to validate the record as being qualified (act 320). Assuming that the record is validated, the record may be returned to an application that originated the query. (Act 310).

If, during act 320, the record is not validated as being qualified, then act 312 may be performed to determine whether the last entry of the main index has been processed.

If, during act 312, the last entry of the main index is determined to have been processed, then the second process may be stopped, if it is executing, because all records have been scanned according to the main index (act 322).

With respect to the second process, a helper scan may be started during act 324. In some embodiments, the helper scan may execute while the first process is running.

A record, corresponding to a current RID being processed by the helper scan, may be accessed (act 326) and a determination may be made regarding whether the current record is qualified based on the predicate included in the SQL statement (act 328). If the record is determined to be qualified, then the corresponding RID may be indicated as qualified in the lookup data structure being built (act 330).

After performing act 330, or after determining that the record is not qualified during act 328, a determination may be made regarding whether a last RID of the helper scan has been processed (act 332). If the last RID of the helper scan has not been processed, then a next RID entry corresponding to a next record may be obtained (act 334) and acts 326-332 may be repeated.

Figure 4:
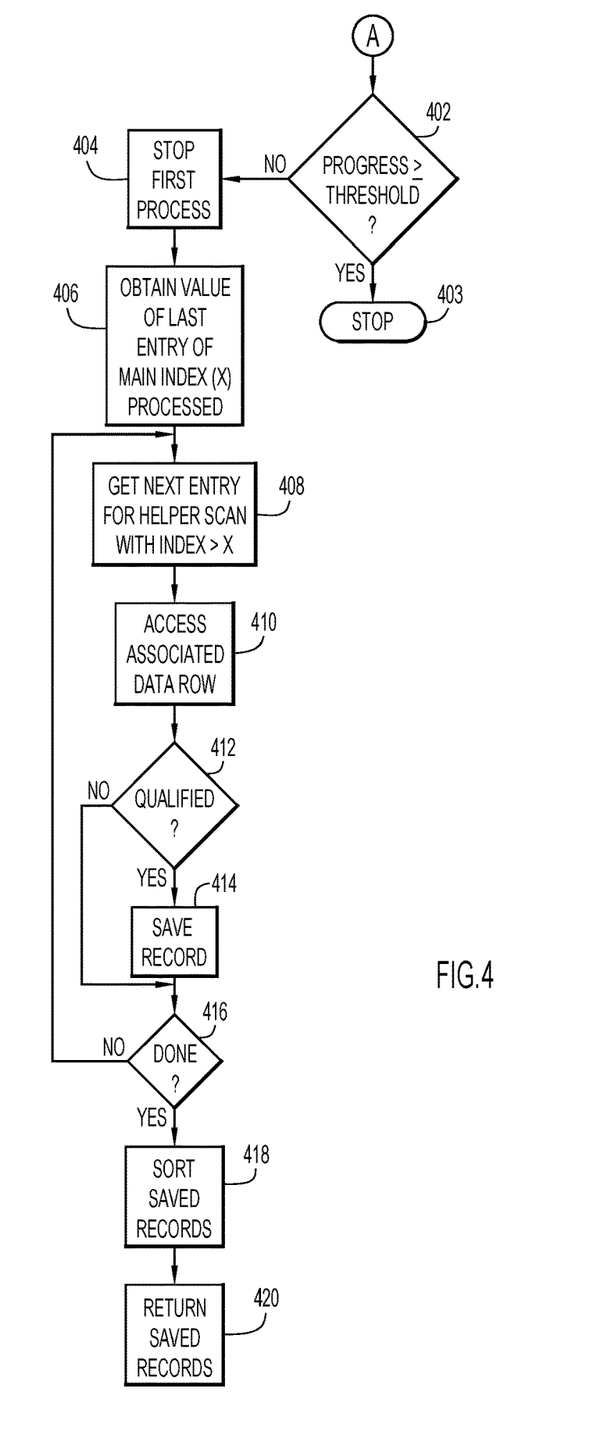

If, during act 332, no additional RID entries exist, then a progress of the first process may be determined (act 336). In one embodiment, this may be performed by determining a number of records, Y, processed by the second process and a number of records, X, processed by the first process. A percentage of a total number of records processed by the first process may be determined according to: progress=X/Y. A determination may then be made regarding whether progress is greater than or equal to a threshold (act 402; FIG. 4). If progress is determined to be greater than or equal to the threshold, then the second process may be stopped at act 403 and the main index scan of the first process may be allowed to complete. In some embodiments, the threshold may be 95%. In other embodiments, another suitable value may be used. At this point, the lookup structure from the helper scan would be made available for act 304. In an alternative embodiment, a number of records remaining to be processed by the main index may be calculated according to: remaining=Y−X. In this alternative embodiment, instead of determining whether progress is greater than or equal to a threshold, in act 402, a value of remaining may be compared to a second threshold, and if remaining is determined to be less than the threshold, the second process may be stopped and the first process may be permitted to complete. For example, if the second threshold is 75 records, then if fewer than 75 records remain to be scanned according to main index, then the second process may be stopped and the main index scan may be allowed to complete. Otherwise, act 404 may be performed.

During act 404, the first process may be stopped or terminated. Next, a value of a last entry of the main index that has been processed may be obtained (act 406) to ensure that rows already processed by the main index are not also processed from the helper scan result. For example, assuming the main index includes (LASTNAME, FIRSTNAME) and the value of the last entry of the main index that has been processed is (Smith, John), then only values from the helper index that would follow (Smith, John) in an ordered index would be processed.

A next entry of a result of the helper scan is processed (act 408) and the associated data row accessed (act 410). A determination may be made regarding whether the record is qualified (act 412) based upon a predicate retrieved from the progress of the main index (see act 406) and any other predicates from the original query. If the record is determined to be qualified, the record may be saved (act 414) after being successfully validated as qualified. If the record had been saved, during act 414, or the record had been determined not to be qualified, then a determination may be made regarding whether all entries from the helper scan that have not been processed by a scan of the main index have been processed (act 416). If all entries from the helper scan have not been processed, then acts 408-416 may be performed again. Otherwise, the saved records may be sorted (act 418) and then returned to an originator of the query such as, for example, an application that originated the query (act 420).

In the embodiment illustrated by the flowcharts of FIGS. 3 and 4, the lookup data structure may be used to determine whether entries that were not previously scanned using the main index are qualified only if progress is not greater than or equal to the threshold. In another embodiment, after determining that the helper scan is completed, during act 332, if the number of records qualified by the helper scan is significantly smaller than a total number of records, then acts 404-420 may be performed such that the first process is terminated and the second process continues to qualify records not processed by the first process by using the lookup data structure. In some embodiments, the number of records qualified by the helper scan may be considered to be significantly smaller than the total number of records if the number of records qualified by the helper scan is less than a predetermined fraction or of the total number of records. For example, the predetermined fraction may be 1/20 of the total number of records or another suitable fraction of the total number of records.

In another embodiment, as soon as the helper scan completes, the first process may be terminated and the lookup data structure may be used to determine whether entries that were not previously scanned using the main index are qualified.

In some embodiments, the helper scan may provide the lookup data structure to the first process before the helper scan is completed. For example, if the helper scan uses a data partitioned index or performs a page range scan, when the scan of a partition or page range is completed and the lookup data structure updated, the lookup data structure may be made available to the process using the main index. The process using the main index would check the lookup data structure for a corresponding partition level or page range, and if that lookup data structure is available and indicates that a RID from a current entry of the main index corresponds to a qualified record, the record is validated to ensure that it is qualified. Otherwise, if the lookup data structure for the corresponding partition level or the corresponding page range is not available, then the process using the main index would access the record corresponding to the RID to determine whether the record is or is not qualified.

Figure 5:
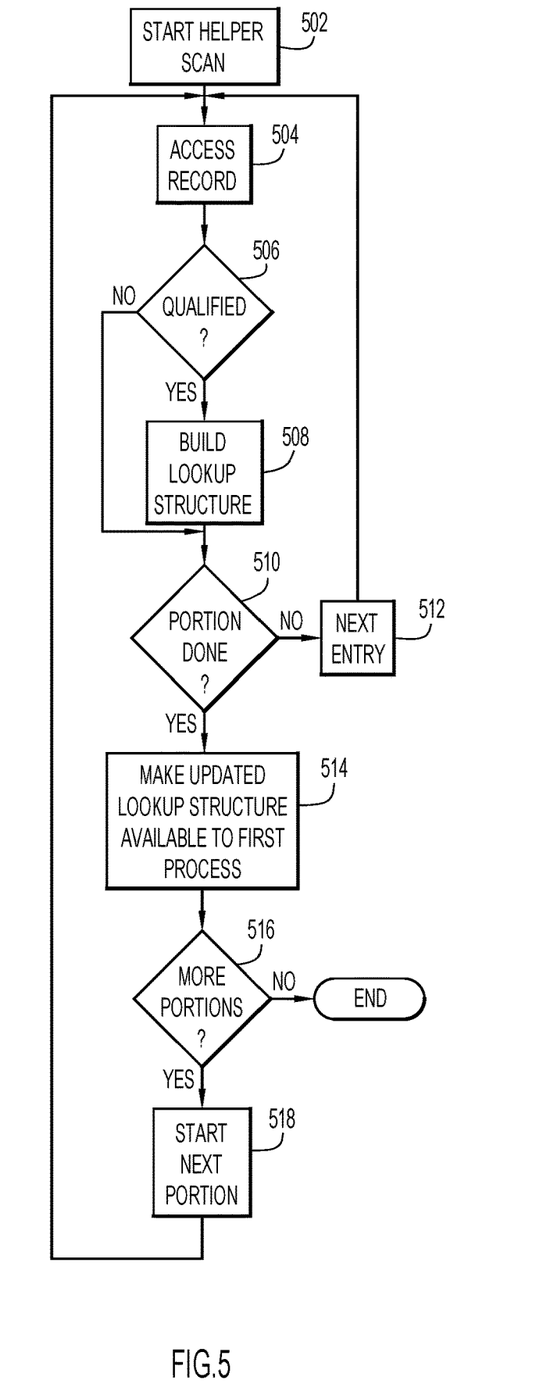
FIG. 5 is a flowchart of an example alternative helper scan process in which a lookup structure is made available to the main index scan when a portion of the helper scan is completed according to an embodiment of the present invention.

FIG. 5 is a flowchart of an example second process in an embodiment in which the lookup data structure is made available to the main index process upon completion of a scan of a portion such as, for example, a partition or a page range. The process may begin by starting a helper scan in parallel with the main index scan and obtaining a first RID of the helper scan (act 502). A record corresponding to the RID may then be accessed (act 504) and a determination made regarding whether the record is or is not qualified based on a predicate in a SQL statement.

If the record is qualified, then the RID may be added to a lookup data structure (act 508). If, during act 506, the record is determined to not be qualified, or after performing act 508, a determination may be made regarding whether scanning of a portion such as, for example, a partition or a page range, is completed (act 510). If the portion is not completed, then a next RID for the helper scan may be obtained (act 512) and acts 504-510 may be repeated.

If, during act 510, the portion is determined to be completed, then the lookup data structure may be made available to the process using the main index for scanning records (i.e., the first process) (act 514). A determination may then be made regarding whether any more portions remain for the helper scan (act 516). If no portions remain to be scanned, then the process is completed. Otherwise, a RID for a next portion of the helper scan may be obtained (act 518) and acts 504-518 may be repeated.

In various embodiments, multiple helper scan processes may be started in parallel, each of which may perform a helper scan on a respective partition or page range.

A number of types of helper scans may be performed to supplement a main index process. The helper scan may:

1. Perform a matching or non-matching index scan to build the lookup data structure, which can be used by the main index process to filter qualifying RIDs from a primary matching index plan step once the helper scan has completed;
2. Perform a matching or non-matching index scan of a range-partitioned index to build the lookup data structure per partition, which can be used to filter the qualifying RIDs from the primary matching index plan step at the partition level once a scan of a partition has completed. This scan could be performed in parallel, one scan per partition;
3. Perform a scan of a single columnar oriented column to build a RID (or tuple) list or lookup data structure, which can be used to filter qualifying RIDs from a primary matching index plan step once this helper scan has completed;
4. Perform a full table space scan, partition level scan or page range scan to progressively update a lookup data structure for qualified RIDs and include a low/high range of pages scanned such that the primary matching index scan will only access a secondary result if it's RID is within a completed helper scan range; and
5. Scan an accelerator as an alternative plan to the primary access method with full results returned. Given that a separate query accelerator will not contain the same RIDs as a main tablespace, then completion of a helper scan on a separate accelerator is useful to return a full result set rather than a qualified list of rows to assist the main index. Rows already processed by the main index should be excluded from any result returned from the accelerator.

Multiple helper index scans may be employed for 1, 2 and 3 above. For either 4 or 5, only one helper scan would be chosen. As, previously mentioned, helper scans may be background tasks that utilize parallelism for increased efficiency.

Optimal performance with minimal overhead will come from helper index scans 1 and 2 above.

As referenced in 4, above, this option can provide a lookup data structure result progressively to the main index process. If the helper scan process keeps track of the pages that have been scanned, then the main index process will be able to use the lookup data structure if the RID falls within those pages. This allows the lookup data structure to be made available to the main index process before the helper scan is fully complete.

Table based scans use additional CPU resources which can inhibit their implementation in a Hybrid Transactional/Analytical Processing (HTAP) system if concurrent OLTP and OnLine Analytic Processing (OLAP) performance is impacted because OLAP systems often employ massive parallelism that can dominate the resources. Thus, adding further scans may diminish concurrency unless sufficient resources exist.

The environment of present invention embodiments may include any number of computers or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software, etc.). These systems may include any types of monitors and input devices (e.g., keyboard, mouse, voice recognition, etc.) to enter and/or view information.

It is to be understood that the software of the present invention embodiments may be implemented in any desired computer language and could be developed by one of ordinary skill in the computer arts based on the functional descriptions contained in the specification and flowcharts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and may communicate via any suitable communications medium (e.g., LAN, WAN, Intranet, Internet, hardwired, modem connection, wireless, etc.). For example, the functions of the present invention embodiments may be distributed in any manner among the various systems, and/or any other intermediary processing devices. The software and/or algorithms described above and illustrated in the flowcharts may be modified in any manner that accomplishes the functions described herein. In addition, the functions in the flowcharts or description may be performed in any order that accomplishes a desired operation.

The software of the present invention embodiments may be available on a non-transitory computer usable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information. The database system may be implemented by any number of any conventional or other databases, data stores or storage structures (e.g., files, databases, data structures, data or other repositories, etc.) to store information. The database system may be included within or coupled to a server and/or client systems. The database systems and/or storage structures may be remote from or local to the computer or other processing systems, and may store any desired data.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A machine-implemented method for using a secondary scan to optimize a database query, the machine-implemented method comprising:
performing, via at least one computing device, a first index scan of records of a database table, a first index used by the first index scan being specified in a database management system query statement as being ordered by one or more field values of one or more fields of the first index;
performing, via the at least one computing device, a second scan of the database table to determine whether each respective record of the second scan of the database table is qualified based on one or more fields of the each respective record of the second scan and a predicate;
building, via the at least one computing device, a lookup data structure indicating whether each of the respective records of the second scan is qualified;
using, via the at least one computing device, the lookup data structure to determine whether a record of the first index scan is qualified when the lookup data structure becomes available; and
performing, via the at least one computing device, when the second scan completes before the first index scan:
determining an amount of progress of the first index scan,
performing, when the amount of progress of the first index scan is less than a predetermined threshold:
terminating the first index scan,
sorting record identifiers of qualified records of the second scan based on one or more associated fields of the qualified records of the second scan, and
returning the qualified records of the second scan in sorted order.

2. The machine-implemented method of claim 1, further comprising:
terminating the second scan when the first index scan completes before the second scan.

3. The machine-implemented method of claim 1, further comprising:
when the second scan completes before the first index scan, performing:
performing, when the amount of progress of the first index scan is one of equal to the predetermined threshold and greater than the predetermined threshold:
making a result of the second scan available as the lookup data structure for the first index scan; and
further performing, when the amount of progress of the first index scan is less than the predetermined threshold:
processing the result of the second scan without re-processing records scanned by the first index scan.

4. The machine-implemented method of claim 1, wherein the second scan is one of a table based scan and an index scan.

5. The machine-implemented method of claim 1, wherein:
the second scan is one of a partition scan and a page range scan,
the lookup data structure is progressively built, and
the lookup data structure is made available to the first index scan before the second scan scans all of the records of the database table.

6. The machine-implemented method of claim 1, wherein the lookup data structure includes one of a hash table, a list of record identifiers of qualified rows of the database table, a bitmap and a bloom filter.

* * * * *